United States Patent [19]

Mikkelson

[11] Patent Number: 4,986,311

[45] Date of Patent: Jan. 22, 1991

[54] APPARATUS FOR CLEARING FROZEN WATER LINES

[76] Inventor: James D. Mikkelson, Rte. 1, Box 9AA, Waubay, S. Dak. 57273

[21] Appl. No.: 391,231

[22] Filed: Aug. 9, 1989

[51] Int. Cl.$^5$ .............................................. E03B 7/14
[52] U.S. Cl. ......................................... 138/35; 138/32
[58] Field of Search ............................. 138/32, 35, 89; 134/166 C; 137/74; 15/104.061

[56] References Cited

U.S. PATENT DOCUMENTS

| | | | |
|---|---|---|---|
| 77,857 | 5/1868 | Young | 138/35 |
| 458,503 | 8/1891 | Simpson | 138/35 |
| 529,204 | 11/1894 | Simpson | 138/35 |
| 1,243,973 | 10/1917 | Philippon | 138/35 |
| 1,361,023 | 12/1920 | Darley | 138/35 |
| 4,102,358 | 7/1978 | Sherock | 138/35 |
| 4,124,039 | 11/1978 | St. Laurent | 138/35 |
| 4,250,925 | 2/1981 | Mast | 138/35 |
| 4,449,553 | 5/1984 | Sullivan et al. | 138/35 |

Primary Examiner—Frankie L. Stinson
Attorney, Agent, or Firm—Kinney & Lange

[57] ABSTRACT

Apparatus for clearing frozen water lines or conduits includes a wheel mounted cart or main frame supporting a holding tank or reservoir open to the atmosphere along with means for heating the holding tank. A vertical standpipe has a top end portion open to the atmosphere and a bottom end portion which can be attached to, and longitudinally aligned with, an open end portion of an ice blocked conduit to be cleared. A first hollow return line is open from a part of the standpipe vertically above the holding tank and into the holding tank. A second hollow return line is open from a portion of the standpipe above the first return line and below the open top of the standpipe, and it, too, opens into the holding tank. An inner end of a length of flexible tubing is extended down through the standpipe and into the conduit to be adjacent to the ice to be cleared. A pump is open to the bottom of the holding tank and to an outer end of the flexible tubing. Water or other appropriate circulating fluid is initially entered into the holding tank in enough volume to fill the pump, the flexible tubing, the blocked portion of the conduit, and the standpipe up to the opening of the first return line, after the water has been heated in the holding tank and the pump has been turned on.

12 Claims, 5 Drawing Sheets

//
4,986,311

APPARATUS FOR CLEARING FROZEN WATER LINES

BACKGROUND OF THE INVENTION

1. Field of the Invention

This invention has relation to apparatus useful for clearing out conduits and for thawing out frozen water lines whether or not those lines and conducts can withstand high pressure, mechanical deformation, or the application of excessive heat.

2. Description of the Prior Art

For many years, iron water pipes have been cleared of ice by attaching heavy electrodes on either side of the frozen portions and passing heavy current between the electrodes thus heating the pipe to melt the ice. Such methods are of no value when there can be no access to both ends of a frozen portion of metallic pipe. Obviously, this method is of no value with plastic pipe or other pipe which is a nonconductor of electricity.

Blow torches have been used very effectively in the past to melt ice in metal pipes. This option is not available for use with pipes which cannot withstand the heat.

It is known to clear conduits of ice by inserting flexible tubing or hosing into the frozen conduits and forcing steam through the tubing to melt the ice in the conduit. See ancient U.S. Pat. No. 77,857 granted to Young on May 12, 1868. In the disclosure of that patent, the steam discharges upwardly from a horizontal pipe situated in horizontal alignment with the conduit to be cleared. It appears that the melted ice water and any condensed steam would run right back out of the feed pipe onto the ground.

Structures showing hot water forced from a tube into a horizontal pipe to melt the ice, with the melted ice water and the water for melting which was forced into the frozen conduit running back onto the ground, are shown in U.S. Pat. No. 458,503 granted to Simpson on Aug. 25, 1891; U.S. Pat. No. 29,204 also to Simpson, granted on Nov. 13, 1894; and U.S. Pat. No. 1,361,023 granted to Darley on Dec. 7, 1920.

Closed circuit systems for forcing hot water into frozen pipes and then returning that water to heat boilers to once again be circulated into the pipe are shown in U.S. Pat. No. 1,243,973 granted to Philippon on Oct. 23, 1917 and U.S Pat. No. 4,449,553 granted to Sullivan et al on May 22, 1984. These systems are not designed in such a way that a water thawing apparatus can easily be transported to any location where needed, and where the actual melting operation is carried out using components which are at all times open to the atmosphere. The Philippon and Sullivan patents are designed to obtain results similar to that achieved with the present invention; but in a much more awkward, expensive and unwieldy manner.

Another apparatus for clearing frozen water lines which is subject to some of the same objections as the apparatus shown in the Philippon and Sullivan patents is shown in U.S. Pat. No. 4,250,925 granted to Mast on Feb. 17, 1981. The Mast structure contemplates running a flexible tube into a frozen conduit, and having the recirculating heated water and thawed ice water drop into a relatively huge holding tank from whence the water is sucked into a heater and then pumped through a coil of tubing back into the frozen conduit. The structure suffers from the disadvantage that when the ice block is cleared, the water pressure in the far end of the unblocked conduit will rush into the return line or hose means and will freely spray out of the "end 38, opening to the atmosphere". See the specification of the patent to Mast, column 3, paragraph beginning on line 54.

What was missing before the present invention was a portable device capable of being moved into an area adjacent to an open end of a conduit blocked by ice, which apparatus can remove the ice blockage whether or not water pressure is present at the other end of the conduit on the other side of the block, and to accomplish this result without any loss of water from the system in the room, on the floor, or in whatever other environment the open end of the frozen conduit is present.

None of the prior art cited above or known to the applicant and those in privity with him can be used without the exercise of inventive faculty to clear from one end thereof obstructions such as scale and other deposits.

Neither applicant nor those in privity with him are aware of any prior art which is closer than that discussed above or which anticipates the claims set out herein.

SUMMARY OF THE INVENTION

An apparatus for clearing a conduit which is obstructed by a removable substance and is blocked includes a reservoir open to the atmosphere; a substantially vertical standpipe having a top end portion open to the atmosphere; a means for attaching a bottom end of the standpipe to be open to and in sealing relation with respect to an open end portion of the blocked conduit; a hollow return line open from an intermediate portion of the standpipe at a position vertically above the effective height of the reservoir and back into the reservoir; a length of hollow, relatively rigid but flexible tubing adapted to have a first discharge end thereof inserted into an open top end portion of the standpipe and through the standpipe into a blocked conduit and having a second input end, the tubing having an outer dimension substantially less than the minimum inner diameter of the blocked conduit; a pump having an intake port open to a bottom portion of the reservoir and a discharge port open to the second intake end of the flexible tubing. The apparatus of the invention also includes sufficient circulating fluid situated initially within the reservoir so that when the pump is put into operation, the fluid will more than fill the pump, the tubing, the blocked portion of the conduit and that portion of the standpipe below the opening of the return line into the standpipe. The circulating fluid has a property of reducing to a flowable stream the substance obstructing the conduit.

In the case of a conduit blocked with ice, this circulating fluid can well be heated water. Where the obstruction to be cleared is scale or other mineral buildup, the circulating fluid can be any fluid solvent capable of dissolving or otherwise removing such buildup.

DETAILED DESCRIPTION OF THE PREFERRED EMBODIMENTS

Figure 1:
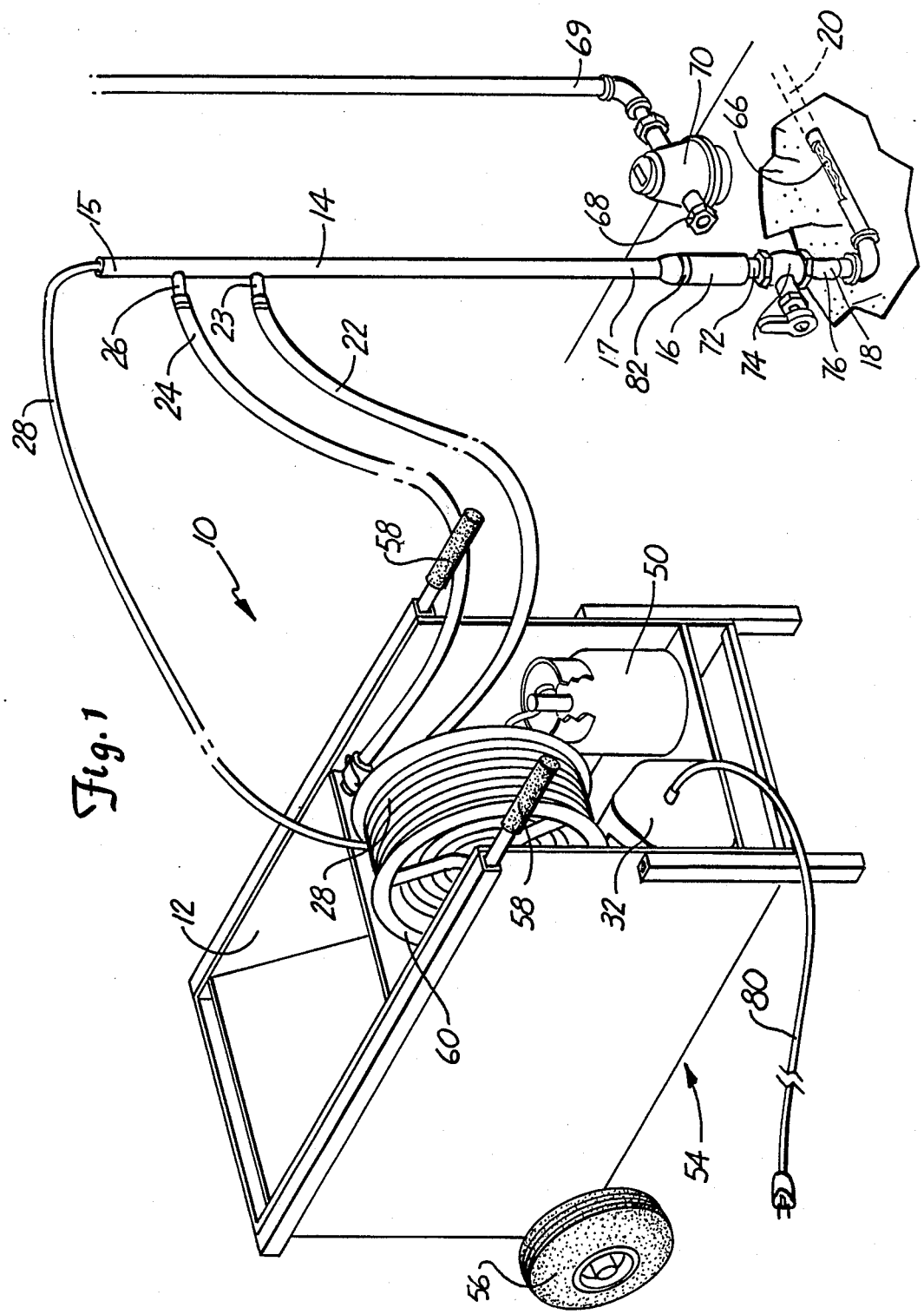
FIG. 1 is a perspective view of the apparatus of the invention connected to an underground household water service conduit in position to thaw an ice blockage and obstruction in the conduit.

An apparatus 10 is for clearing a conduit which is obstructed by a removable substance such as ice or scale and other mineral buildup. The apparatus will be effective either in situations where the conduit is completely blocked by ice, for example; or where the conduit is only obstructed by boiler-like scale and is completely blocked by a valve or the like located at the far end of a portion of the conduit to be cleared.

As seen in FIGS. 1 through 4 in a first form of the invention, such apparatus 10 includes a holding tank or reservoir 12; a generally upright standpipe 14 having a top end portion 15 open to the atmosphere; an attaching means 16 such as a union, a coupling which can be either straight, reducing or expanding, and/or a nipple for connecting a bottom end 17 of the standpipe 14 to be open to, longitudinally aligned with, and in sealing relation with respect to an open end portion 18 of an obstructed and blocked water service pipe or conduit 20 which is to be cleared. The apparatus 10 also includes a first hollow return line 22 which is open from an intermediate portion 23 of the standpipe 14 at a position vertically above the effective height of the reservoir 12 and into the reservoir; a second hollow return line 24 open to the standpipe 14 at a point 26 between its open top end portion 15 and the intermediate portion 23 of the standpipe; and a length of hollow, relatively rigid but flexible tubing 28 of size and character to be inserted into the open top end portion of the standpipe, down through the standpipe and into the blocked conduit. The tubing 28 has a first discharge end 30 and will be fed into the conduit until this first discharge end encounters the blockage.

A pump 32 has an intake port 34 open to a bottom portion of the reservoir or holding tank 12 and a discharge port 36 which is open to a second intake end portion 38 of the flexible tubing 28. The pump can be of any usual or preferred construction.

Part of the apparatus 10 includes a circulating fluid 44. Initially, this fluid will be situated primarily in the reservoir 12. Where the obstruction and blockage in the conduit to be cleared is ice, this circulating fluid will, in almost every instance, be water. However, where the apparatus of the invention is being used to clear a conduit of scale, other mineral buildup, or any other dissolvable or movable material, the circulating fluid can be a liquid which includes a solvent such as chlorine, household bleach, lime solvent, or the like.

Heater means 46 is provided for supplying heat to the water or other circulating fluid when this is necessary or desirable. This heat could be supplied in many ways such as by putting an electric immersion heater right into the reservoir. However, in the form of the invention as shown, the heater means includes a gas burner 48, a source of heating gas under pressure 50, a gas flow regulator 52 attached to the reservoir 12 and including temperature sensitive transducer means in contact with the water or other circulating fluid for controlling the flow of heating gas from the source to the burner.

In order to make up a unit which can be easily moved into position to clear a blocked conduit, in the form of the invention as shown, the reservoir 12, the gas burner 48, the pressurized source of heating gas 50, and the gas regulator 52 are all mounted to a main frame or cart 54 which is supported on wheels 56,56. The cart also has removable handles 58,58 so that the heaviest elements of the apparatus can be easily moved into position adjacent an open end portion 18 of a blocked conduit 20.

A storage reel 60 is rotatably mounted with respect to the main frame 54, and a reel swivel fitting 62 of any usual or preferred construction has a fixedly mounted portion open to the discharge port 36 of the pump 32. The second intake end portion 38 of the flexible tubing 28 is open to that portion of the reel swivel fitting 62 which rotates with the storage reel 60. When the apparatus is not in use, virtually all of the tubing 28 will be stored on the storage reel. It has been found that as much as two hundred feet of this tubing can be used effectively in clearing ice from conduits of almost that full length.

The apparatus of the invention has been found to be particularly effective for clearing $\frac{3}{4}''$ frozen water service conduits using flexible tubing having an outside diameter of $\frac{3}{8}''$ and an inside diameter of $\frac{1}{4}''$. It is equally effective in clearing conduits ranging in size from $\frac{1}{2}''$ to 12'' by using various sizes of tubing.

OPERATION

Figure 2:
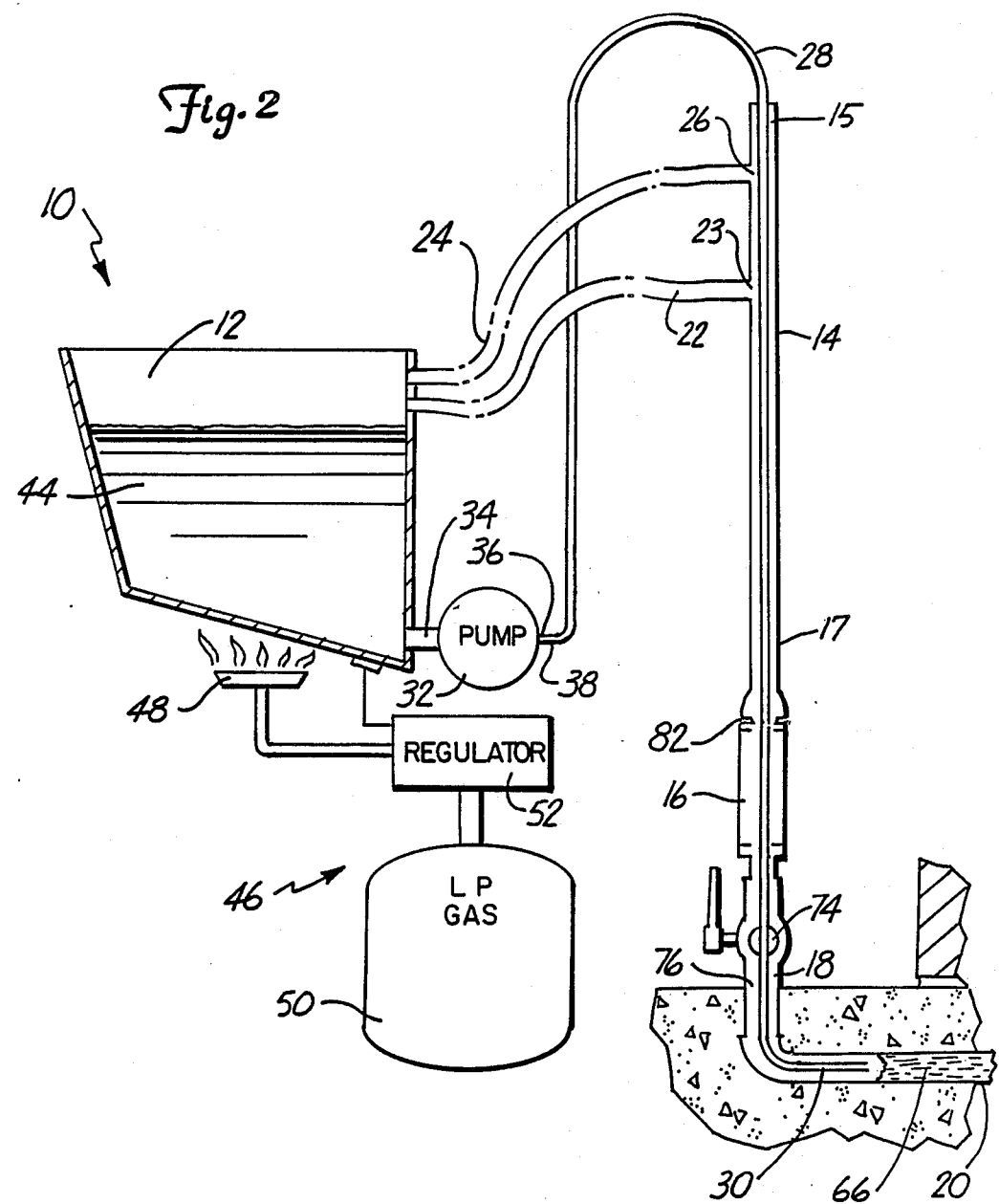
FIG. 2 is a schematic view of the elements of a first form of the invention as they relate to an obstructed and/or blocked conduit.
Figure 3:
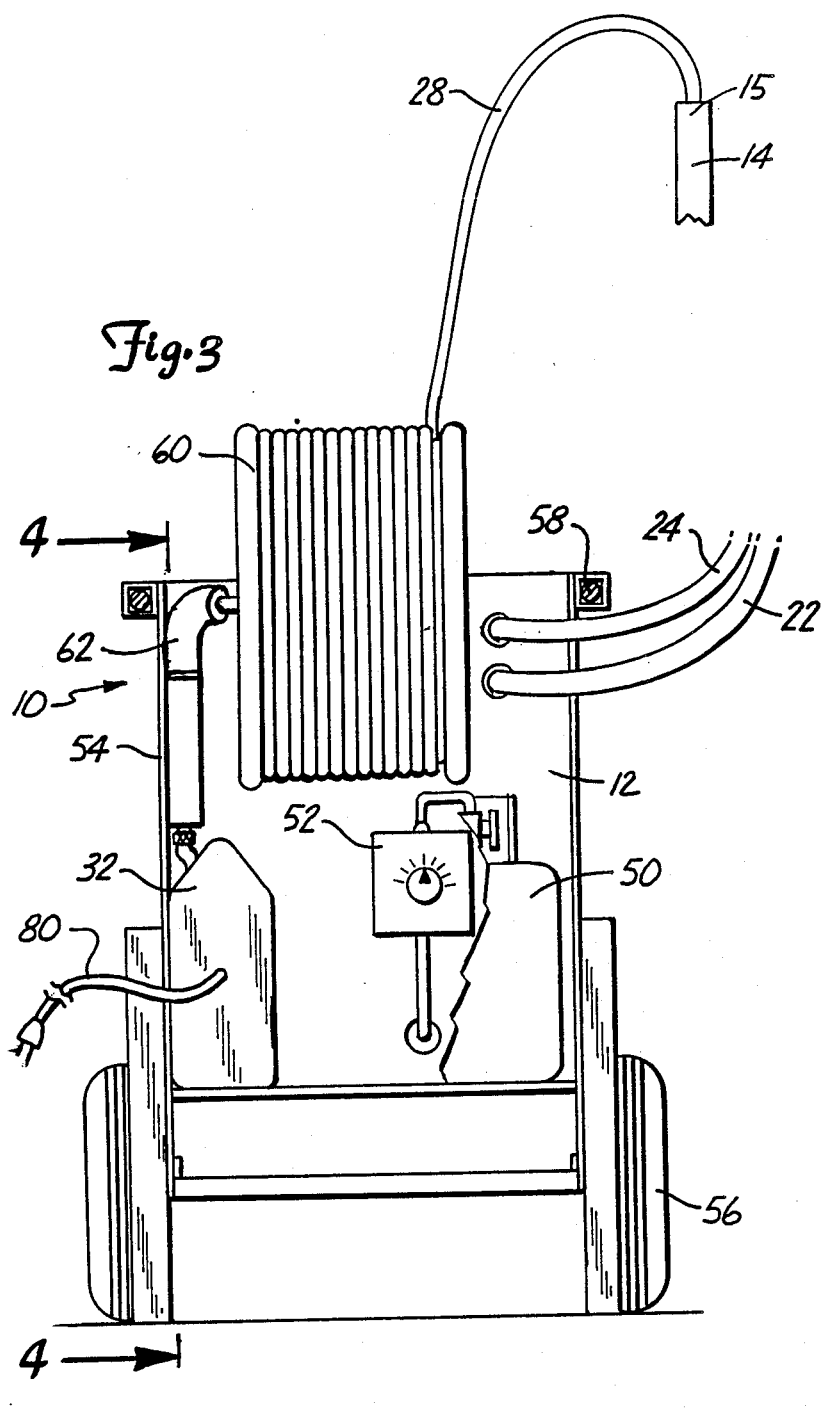
FIG. 3 is a front elevational view of a main frame or cart of the apparatus of the invention as seen in FIG. 1 and showing the positioning of some of the other elements of the invention with respect to the cart.
Figure 4:
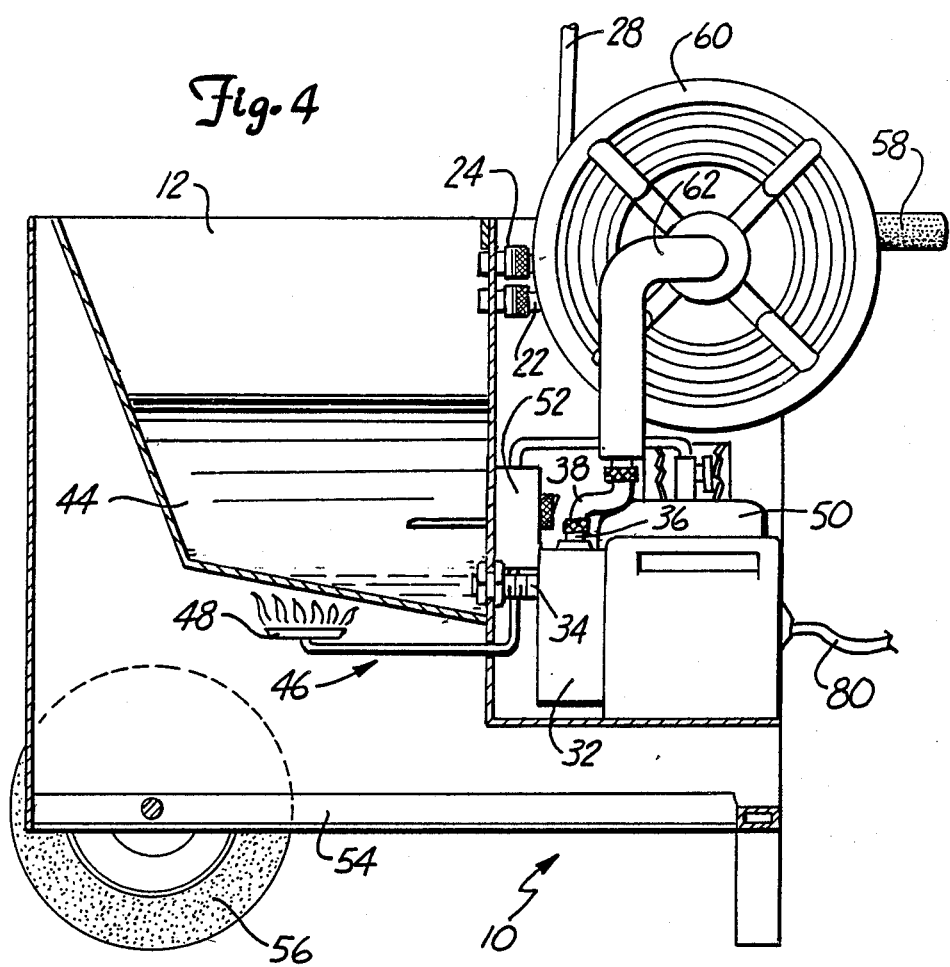
FIG. 4 is a sectional view taken on the line 4—4 in FIG. 3 disclosing a side elevational view of the cart and various of the elements of the invention mounted thereon.

As seen in FIGS. 1 and 2, the apparatus 10 of the present invention is hooked up to remove an obstruction and blockage of ice 66 in conduit 20. To accomplish this, a union 68 connecting a household intake pipe 69 and a water meter 70 to water service pipe 20 had to be opened, and a part of that union, a short pipe and elbow (not shown) had to be removed from a nipple 72 extending upwardly from a shutoff valve 74 which remains directly connected to an upright portion 76 of the ice blocked conduit 20. Means 16 for attaching the bottom end portion 17 of the standpipe 14 was then attached to the nipple 72, and the flexible tubing 28 was next inserted into the top open end portion 15 of the standpipe and fed down through the means 16, nipple 72 and valve 74 into the blocked conduit 20.

At this point, it has been found to sometimes be advantageous to begin circulating the water or other circulating fluid 44. Where water is to be used, if it is not already in the reservoir, it will be placed in the reservoir from an outside source. In a typical case, as much as five gallons may need to be placed in the reservoir in order to have more than enough water to fill the pump, the tubing, that portion of the standpipe below the opening of the first return line into the standpipe, and that portion of the conduit between its connection to the standpipe and the blockage, when the pump is put into operation. In this example, since it is the water service conduit 20 from the main which is frozen, it may be necessary to bring the water for the reservoir in a five gallon can, for example, along with the rest of the apparatus of the invention.

As soon as the water is in the reservoir, the heater means 46 can be activated to start heating the water. To begin circulation, an electrical cord 80 to the pump 32 need only be plugged into a convenient 110 volt outlet. The water will then move through the flexible tubing and out into the blocked conduit 20 until that conduit is substantially filled. As the water pumping continues, it will back up in the standpipe and will return through the first return line 22 to the reservoir to be recirculated.

By using a tubing which has an interior open cross-sectional area which does not exceed the open cross-sectional area between the interior of the blocked conduit and the outside of the tubing, something akin to a venturi effect is created at the first discharge end 30 of the tubing 28 due to the pressure drop caused when the water leaves the tubing and starts to circulate back on the outside of the tubing but inside of the conduit. This pressure differential "encourages" the tubing to feed along the blocked conduit thus allowing the tubing to be fed the entire length of the blocked conduit until the actual obstruction and blockage 66 of ice is encountered by the tubing.

As the obstructing ice 66 is melted away, the tubing is continuously fed toward the ice. As the ice is melted, the thawed ice water will be recirculated back to the reservoir along with the original water.

In a test of an early form of the invention, ice completely blocking a length of ¾" clear plastic pipe at a temperature of less than 30° below zero Fahrenheit, was thawed at a rate of over 100 feet of ice per hour.

Typically, it is not possible, advisable, or practical to turn off the water pressure at the far end of an ice blocked conduit. Therefore, when the ice block 66 is finally removed, the water under pressure in the remainder of the conduit will rush through the conduit and back up the standpipe. At the point that the cross-sectional area of the first return line 22 is not enough to handle the flow, the water will back up in the standpipe and flow out through the second return line 24 into the reservoir 12.

As soon as the occurrence of a sudden reverse flow of water indicates that the blockage has been cleared, the tubing 28 will be rapidly rolled back up on the storage reel 60 at least until its discharge end portion 30 is clear of the valve 74. As soon as that happens, the valve 74 can be closed, and the flow of water under pressure along the conduit will be blocked. At the same time, the pump 32 can be deactivated.

In actual practice, it has been found that if the reservoir can hold as much as fifteen gallons more than its startup volume, this operation can be completed without depositing any significant amount of circulating water, thawed ice water, and water under pressure from the other end of the conduit on or around the environment in which the apparatus is working.

After the shutoff valve 74 is closed, the attachment means 16 can be removed, and the connection between the valve 74 and the water meter 70 reestablished to put the water service conduit "back in business" connected to the household intake supply line 69.

To prepare the apparatus of the invention for removal from the site, the flexible tubing 28 can be removed from the standpipe 14 and its discharge end 30 situated over a convenient drain. At this time, the pump 32 can be reactivated and all or any desired portion of the water in the reservoir can be pumped out.

In order to more easily handle the backflow of water under pressure after the obstruction and blockage 66 has been melted, a restrictor 82 can be provided adjacent the bottom end portion 17 of the standpipe and adjacent the means 16 for attaching the standpipe to the obstructed and blocked conduit. See FIGS. 1 and 2.

When using the apparatus of the invention to clear blocked sewer lines, for example, a high pressure pump 32 can be used. The hot recirculating water will melt the ice and the flow of that water under high pressure will carry insoluble waste materials back to the reservoir.

Figure 5:
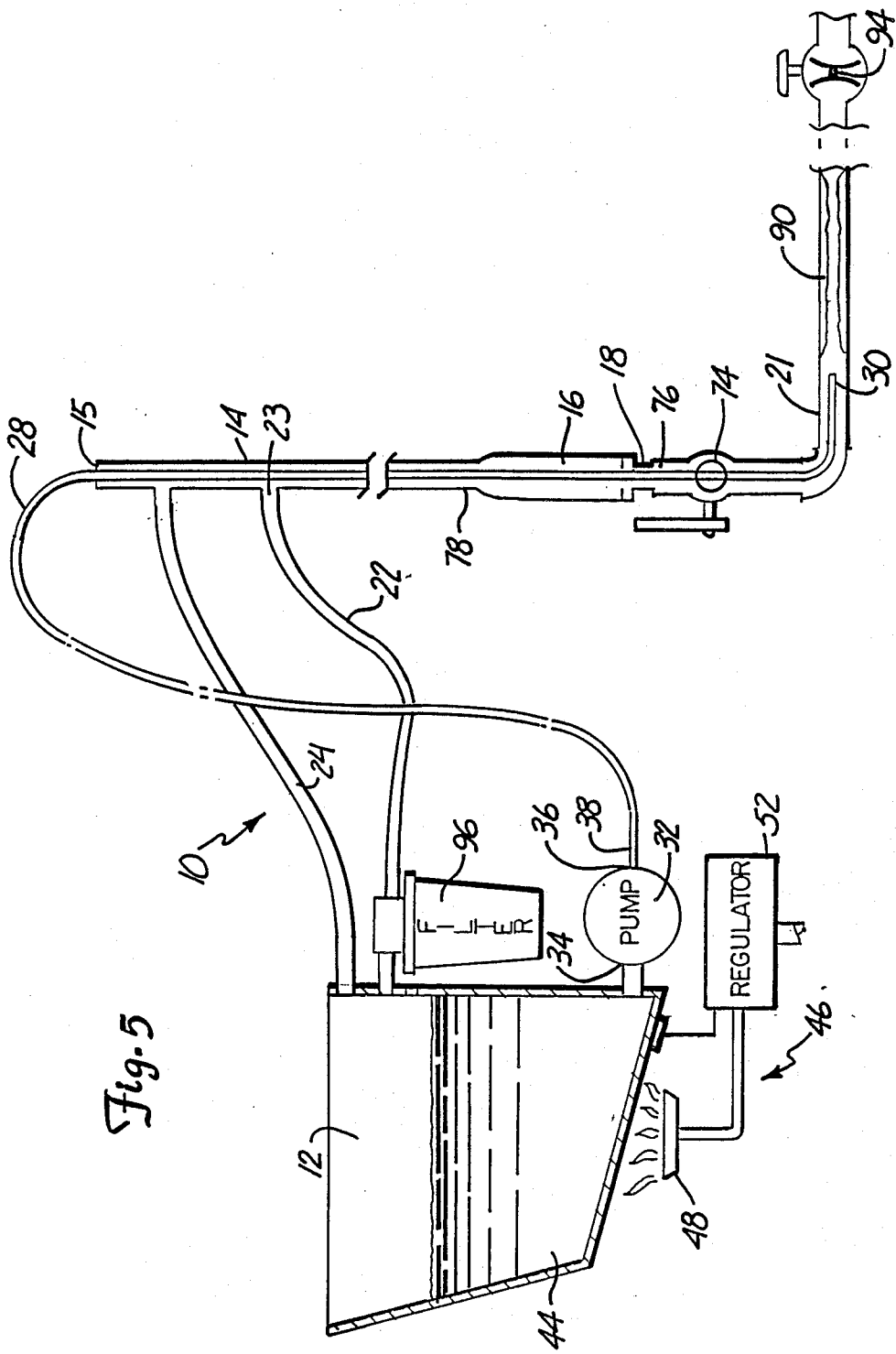
FIG. 5 is a schematic view of further embodiments of the invention.

Further embodiments of the invention are shown in FIG. 5.

To use the apparatus of the invention to remove obstructions in the nature of "boiler scale" 90 and the like in an obstructed conduit 21, it is necessary that the far end of the conduit be shut off or "blocked" as by a shutoff valve 94, for example. Once this is done, the standpipe 14 and the flexible tubing 28 are installed in substantially the same way as in the first form of the invention.

In order to keep from recirculating undissolved flakes or other particles coming from the obstructed conduit, a filter 96 can be installed in the first return line 22 to filter out such particles. This filter can be of any usual or preferred construction suitable for the purpose.

In most cases, it will be desirable that the second return line 24 be left connected to handle any overflow should the filter 96 become partially or entirely clogged.

In normal situations, the circulating fluid capable of dissolving or otherwise dislodging the obstructions 90 will be operated "cold"; but in aggravated situations, it may be necessary or desirable to increase the effectiveness of the circulating fluid by heating it at least slightly. For that reason, a heater means 46 is shown in FIG. 5.

Although the present invention has been described with reference to preferred embodiments, workers skilled in the art will recognize that changes may be made in form and detail without departing from the spirit and scope of the invention.

What is claimed is:

1. An apparatus for clearing a conduit which is obstructed by a removable substance and is blocked, the apparatus including:
    (a) a main frame;
    (b) a reservoir open to the atmosphere and mounted to the main frame;
    (c) a generally upright standpipe having a top end portion open to the atmosphere;
    (d) means for attaching a bottom end portion of the standpipe to be open to, longitudinally aligned with, and in sealing relation with respect to one open end portion of the obstructed conduit;
    (e) a first hollow return line open from an intermediate portion of the standpipe at a position vertically above the effective height of the reservoir and into the reservoir;
    (f) a second hollow return line open from a portion of the standpipe between the opening of the first return line into the standpipe and the open top end portion of the standpipe, said second return line also being open into the reservoir;
    (g) a length of hollow, relatively rigid but flexible tubing having an outer diameter substantially less than the minimum inner diameter of the blocked conduit, the upright standpipe and the means for attaching the standpipe to the conduit, said tubing being adapted to have a first discharge end thereof inserted freely into the open top end portion of the standpipe, fed freely through the standpipe and into the blocked conduit to have position immediately adjacent the removable substance, and having a second intake end portion, the tubing having dimensions relative to the conduit such that the open cross sectional area of the interior of the tubing does not exceed the open cross sectional area between the outside of the tubing and the interior walls of the conduit, the standpipe and the means for attaching the standpipe to the conduit at any point along the tubing within the standpipe, the attaching means and conduit to allow unimpeded return flow between the outer surface of the tubing and said interior walls to and through the return lines;

(h) a pump mounted to the frame and having an intake port open to a bottom portion of the reservoir and a discharge port open to the second intake end portion of the flexible tubing; and (i) sufficient circulating fluid initially within the reservoir so that when the pump is put into operation, the fluid will more than fill the pump, the tubing, the blocked portion of the conduit and that portion of the standpipe below the opening of the first return line into the standpipe, the circulating fluid having the property of reducing to a flowable stream the substance obstructing the conduit.

2. The apparatus of claim 1 wherein:

(j) heater means is provided on the main frame for supplying heat to the circulating fluid.

3. The apparatus of claim 2 wherein:

(k) the circulating fluid is water.

4. For clearing the conduit of claim 3 when the removable substance blocking the conduit is ice and when water under pressure is present on the side of the blockage opposite the first open end portion of the blocked conduit, the apparatus of claim 3 wherein:

(l) the open cross-sectional areas of the first and second return lines are sufficient to handle the flow of water when the obstruction and block are removed to allow flow of water through the conduit and at least one of the return lines and into the reservoir without flowing out of the top open end portion of the standpipe; and (m) the capacity of the reservoir is sufficient to hold all water moving from the standpipe through the return lines to the reservoir during the period beginning after blockage is removed and the water under pressure begins flowing toward the reservoir and ending after the tubing has been removed from the conduit and the end of the conduit adjacent the standpipe connection has been blocked.

5. The apparatus of claim 2 wherein:

(k) the heater means for supplying heat to the circulating fluid includes the reservoir, a gas burner situated below and in adjacent relation to the reservoir, a source of heating gas under pressure, and a regulator responsive to the temperature of the circulating fluid in the reservoir for controlling the flow of heating gas to the burner.

6. The apparatus of claim 5 wherein:

(l) the heater means also includes a rectangular sheet metal casing having a bottom floor and four generally vertical side walls extending upwardly from the bottom floor, the top edges of these side walls together defining a rectangular casing opening;

(m) the reservoir is defined by four generally upright side walls and a bottom floor situated in spaced relation to the bottom floor of the casing and immediately adjacent and above the gas burner, three of the reservoir side walls being coincident with portions of three of the casing side walls, and with the fourth reservoir side wall being situated in spaced relation with respect to the fourth casing side wall at a first end of the main frame; and (n) there is an open space between the bottom floor of the reservoir and the bottom floor of the casing at a side of the casing opposite the first end of the main frame to allow for passage of secondary air to the gas burner to promote proper combustion, the combustion products from the burner flowing upwardly and outwardly through the space between the fourth side wall of the casing and the reservoir.

7. The apparatus of claim 6 wherein:

(o) the circulating fluid is water;

(p) a storage reel is rotatably mounted on the main frame, a reel swivel fitting is situated between the pump and the flexible tubing, and the second intake end of the flexible tubing is connected to that swivel fitting to be open to the discharge port of the pump, a portion of the length of the tubing being wound onto the storage reel.

8. The apparatus of claim 7 wherein:

(q) the pump is powered by an electrical motor mounted with respect to the main frame;

(r) the main frame is supported for movement over a floor on a plurality of wheels; and (s) removable handles are provided on upper portions of the main frame so that the main frame can be easily wheeled over the floor.

9. An apparatus for clearing a conduit which is obstructed and blocked by ice, the apparatus including:

(a) a reservoir open to the atmosphere;

(b) a generally upright standpipe having a top end portion open to the atmosphere;

(c) means for attaching a bottom end portion of the standpipe to be open to, longitudinally aligned with, and in sealing relation with respect to one open end portion of the blocked conduit;

(d) a first hollow return line open from an intermediate portion of the standpipe at a position vertically above the effective height of the reservoir and into the reservoir;

(e) a second hollow return line open from a portion of the standpipe between the opening of the first return line into the standpipe and the open top end portion of the standpipe, said second return line also being open into the reservoir;

(f) a length of hollow, relatively rigid but flexible tubing adapted to have a first discharge end thereof inserted into the open top end portion of the standpipe and through the standpipe into the blocked conduit, and having a second intake end portion;

(g) a pump having an intake port open to a bottom portion of the reservoir and a discharge port open to the second intake end portion of the flexible tubing;

(h) sufficient water initially within reservoir so that when the pump is put into operation, the water will more than fill the pump, the tubing, the blocked portion of the conduit and that portion of the standpipe below the opening of the first return line into the standpipe; and (i) where heater means is provided to heat the water when in the reservoir.

10. For clearing the conduit of claim 9 when water under pressure is present on the side of the ice blockage opposite the first open end portion of the blocked conduit, the apparatus of claim 9 wherein:

(j) the open cross-sectional areas of the first and second return lines are sufficient to handle the flow of water when the obstruction and block is removed to allow water to flow through the conduit and through at least one of the return lines and into the reservoir without flowing out of the top open end portion of the standpipe; and (k) the capacity of the reservoir is sufficient to hold all water moving from the standpipe through the return lines to the reservoir during the period beginning after the blockage is removed and the water under pressure begins flowing toward the reservoir and ending after the tubing has been promptly removed from the conduit and the end of the conduit adjacent the standpipe connection has been blocked.

11. An apparatus for clearing a conduit which is obstructed by a removable substance and is completely blocked, the apparatus including:

(a) a main frame;

(b) a reservoir open to the atmosphere and mounted to the main frame;

(c) a generally upright standpipe having a top end portion open to the atmosphere;

(d) means for attaching a bottom end of the standpipe to be open to, longitudinally aligned with, and in sealing relation with respect to an open end portion of the blocked conduit which is in spaced relation to said blockage;

(e) at least one hollow return line open from an intermediate portion of the standpipe at a position vertically above the effective height of the reservoir and into the reservoir;

(f) a length of hollow, relatively rigid but flexible tubing adapted to have a first discharge end thereof inserted into the open top end portion of the standpipe and through the standpipe into the blocked conduit and having a second input end, the tubing having dimensions relative tot he conduit such that the open cross sectional area of the interior of the tubing does not exceed the open cross sectional area between the outside of the tubing and the interior of the conduit, the standpipe and the means for attaching the standpipe to the conduit at any point along the tubing within the standpipe, the attaching means and conduit;

(g) a pump mounted to the frame and having an intake port open to a bottom portion of the reservoir and a discharge port open to the second intake end portion of the flexible tubing; and (h) sufficient circulating fluid initially within the reservoir so that when the pump is put into operation, the fluid will more than fill the pump, the tubing, the blocked portion of the conduit and that portion of the standpipe below the opening of the return line into the standpipe, the circulating fluid having the property of reducing to a flowable stream the substance obstructing the conduit.

12. An apparatus for clearing a conduit which is obstructed by a removable substance and is blocked, the apparatus including:

(a) a reservoir open to the atmosphere;

(b) a generally upright standpipe having a top end portion open to the atmosphere;

(c) means for attaching a bottom end of the standpipe to be open to and in sealing relation with respect to an open end portion of the blocked conduit which is in spaced relation to said blockage;

(d) a hollow return line open from an intermediate portion of the standpipe at a position vertically above the effective height of the reservoir and into the reservoir;

(e) a length of hollow, relatively rigid but flexible tubing adapted to have a first discharge end thereof inserted into the open top end portion of the standpipe and through the standpipe into the blocked conduit and having a second input end, the tubing having dimensions relative to the conduit and the standpipe such that the open cross sectional area of the interior of the tubing does not exceed the open cross sectional area between the interior of the conduit and standpipe and the outside of the tubing at any point along the tubing within the standpipe and conduit;

(f) a pump having an intake port open to a bottom portion of the reservoir and a discharge port open to the second intake end of the flexible tubing; and (g) sufficient circulating fluid initially within the reservoir so that when the pump is put into operation, the fluid will more than fill the pump, the tubing, the blocked portion of the conduit and that portion of the standpipe below the opening of the return line into the standpipe, the circulating fluid having the property of reducing to a flowable stream the substance obstructing the conduit.

* * * * *

UNITED STATES PATENT AND TRADEMARK OFFICE
CERTIFICATE OF CORRECTION

PATENT NO.  : 4,986,311
DATED       : January 22, 1991
INVENTOR(S) : James D. Mikkelson It is certified that error appears in the above-identified patent and that said Letters Patent is hereby corrected as shown below:

Col. 8, line 57, after "within" and before "reservoir", insert --the--.

Col. 9, line 39, delete "tot he", insert --to the--.

Signed and Sealed this

Sixteenth Day of June, 1992

Attest:

DOUGLAS B. COMER

*Attesting Officer*        *Acting Commissioner of Patents and Trademarks*